United States Patent [19]

Blake et al.

[11] Patent Number: 4,815,674

[45] Date of Patent: Mar. 28, 1989

[54] RETRACTOR WITH ELECTRO-RHEOLOGICAL LOCK

[75] Inventors: Thomas B. Blake, Mt. Clemens; Gary R. Kurtti, East Detroit, both of Mich.

[73] Assignee: General Motors Corporation, Detroit, Mich.

[21] Appl. No.: 135,714

[22] Filed: Dec. 21, 1987

[51] Int. Cl.$^4$ .............................................. B60R 22/40
[52] U.S. Cl. ................................ 242/107.4 R; 188/267
[58] Field of Search ................ 242/107.4 A, 107.4 R, 242/107.4 B; 280/806; 297/478, 480; 192/21.5; 188/267, 290, 266, 322.5

[56] References Cited

U.S. PATENT DOCUMENTS

| 2,417,850 | 3/1947 | Winslow | 192/21.5 |
| 2,685,947 | 8/1954 | Votrian | 188/267 X |
| 3,144,921 | 8/1964 | Martinek | 192/21.5 |
| 3,240,295 | 3/1966 | Martinek et al. | 188/267 |
| 4,444,298 | 4/1984 | Stangroom | 192/21.5 |
| 4,664,236 | 5/1987 | Stangroom | 192/21.5 X |

FOREIGN PATENT DOCUMENTS 1269792  4/1972  United Kingdom ........ 242/107.4 A

OTHER PUBLICATIONS

Automotive Engineering, Nov. 1985, vol. 93, No. 11, pp. 75-79 entitled, "ER Fluid Devices Near Commercial Stage".

Automotive Industries, p. 28, date unknown, entitled, "Inventors: Got a Use for Liquid that Turns Solid".

Primary Examiner—John M. Jillions
Attorney, Agent, or Firm—Charles E. Leahy

[57] ABSTRACT

According to the present invention a seat belt reel is mounted on a housing by a reel shaft. A locking mechanism for the reel includes a housing of electrically conductive material mounted on the retractor housing and defining a closed cavity communicating with the end of the reel shaft. A disc shaped electrode is located in the cavity of the housing and is attached on the end of the reel shaft by an electrically insulating connector. An electro-rheological fluid fills the cavity to fill the space between the electrode and the housing. An electrical circuit including an inertia sensor and a high voltage source applies a voltage differential between the electrode and the housing upon the occurrence of a vehicle deceleration condition so that the electro-rheological fluid changes to a solid to fix the electrode to the housing and thereby lock the reel shaft against rotation to fix the length of the seat belt.

2 Claims, 1 Drawing Sheet

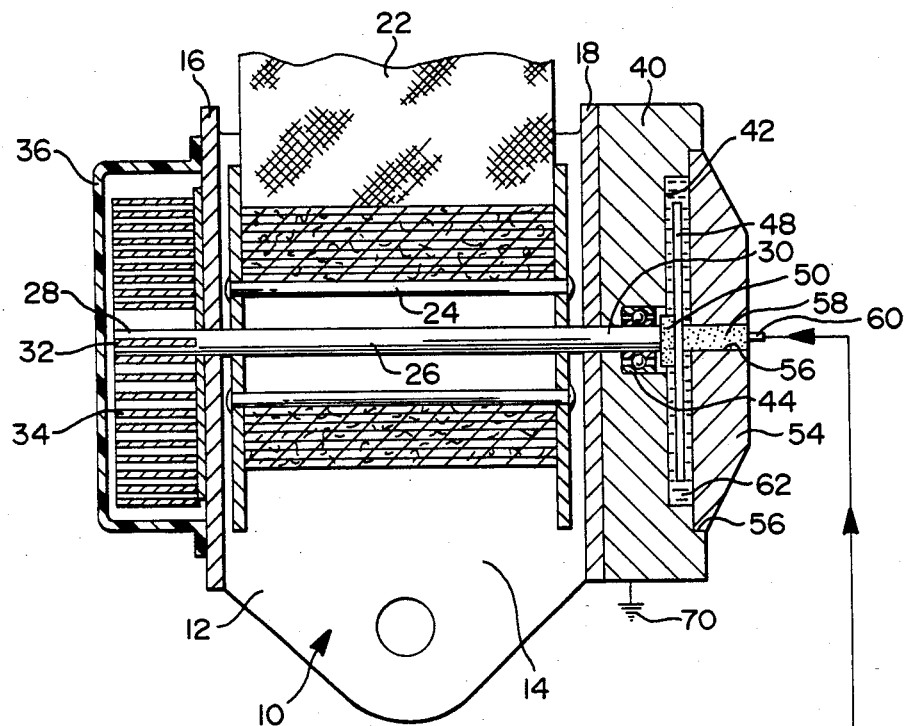
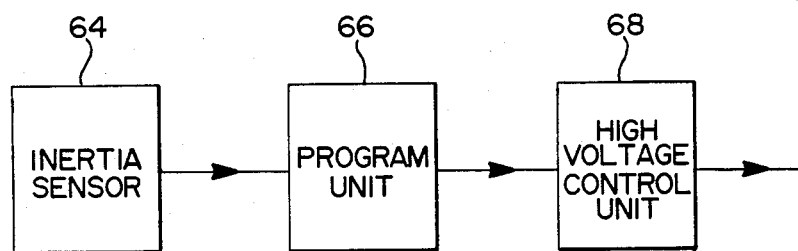

RETRACTOR WITH ELECTRO-RHEOLOGICAL LOCK

The invention relates to an inertia locking seat belt retractor and more particularly provides an electro-rheological locking mechanism for a seat belt retractor.

BACKGROUND OF THE INVENTION

It is well known in motor vehicles to utilize a seat belt for restraining a seated occupant. The belt is attached to a retractor having a belt reel rotatably mounted on a retractor housing by a reel shaft. The reel shaft has one end connected to a spiral spring to bias the reel in a direction to wind up the belt. The other end of the reel shaft typically carries a toothed sprocket which is engageable by a locking pawl to lock the reel shaft against rotation in the belt unwinding direction. The locking pawl is typically operated by an inertia sensing mechanism which may be a pendulum or an inertia switch coupled to an electrical actuator such as a solenoid.

SUMMARY OF THE INVENTION

According to the present invention a seat belt reel is mounted on a housing by a reel shaft. A locking mechanism for the reel includes a housing of electrically conductive material mounted on the retractor housing and defining a closed cavity communicating with the end of the reel shaft. A disc shaped electrode is located in the cavity of the housing and is attached on the end of the reel shaft by an electrically insulating connector. An electro-rheological fluid occupies the cavity and fills the space between the electrode and the housing. An electrical circuit including an inertia sensor and a high voltage source applies a voltage differential between the electrode and the housing upon the occurrence of a vehicle deceleration condition so that the electro-rheological fluid changes to a solid to fix the electrode to the housing and thereby lock the reel shaft against rotation to fix the length of the seat belt.

Accordingly, the object feature and advantage of the invention resides in the use of an electro-rhelogical fluid mounted in a cavity of a retractor housing to lock an electrode disk carried by the reel shaft upon the occurrence of a vehicle deceleration condition.

BRIEF DESCRIPTION OF THE DRAWING

The drawing shows a seat belt retractor having parts broken away and in a section to show an electro-rhelogical device and the electrical control circuit therefore.

DESCRIPTION OF THE PREFERRED EMBODIMENT

Seat belt retractor 10 includess a retractor housing 12 with a base wall 14 and spaced apart sidewalls 16 and 18. The seat belt 22 is wrapped around a belt reel 24. The reel 24 is mounted on the retractor housing 12 by a reel shaft 26 which has a left hand end 28 extending through the retractor side wall 16 and a right hand end 30 extending through the retractor side wall 18.

The left hand end 28 of the reel shaft 26 has a slot which receives the inner end 32 of a spiral spring 34. The outer end of the spiral spring 34, not shown, is mounted on a spring housing 36 which is attached to the retractor side wall 16. The spiral spring 34 works to bias the reel shaft 26 in the belt winding direction of rotation.

A locking mechanism is provided on the right hand end 30 of the reel shaft 26. A housing member 40, of electrically conductive material, is mounted on the retractor sidewall 18 and has an outwardly facing cavity 42 defined therein. The right hand end 30 of the reel shaft 26 extends into the cavity 42 and is rotatably journal therein by a roller bearing assembly 44.

An electrode 48, in the shape of a disk, is situated in the cavity 42 and is mounted on the right hand end 30 of the reel shaft 26 by a connector 50. The connector 50 is constructed of a dielectric material so that the electrode 48 is electrically insulated from the reel shaft 30.

A housing cover 54, constructed of an electrically conductive material, is seated within a recess 56 of the housing member 40 and closes the cavity 42. The housing cover 54 has a central aperture 56 which receives a bushing 58 attached to the electrode 48. An electrical conductor 60 extends through the bushing 58 and is attached or otherwise electrically connected with the electrode 48.

As seen in the drawing, the electrode 48 is suspended within the cavity 42 so that belt winding unwinding rotation of the reel and the reel shaft 26 will cause the electrode 48 to rotate within the cavity 42.

The cavity 42 is filled with an electro-rheological fluid. Such fluids are composed of porous solid particles suspended in a non-mixing blend of oil and water. The porous solid particles are a polymerized monomer mixture finally ground into particles. In the inert state of the fluid, the particles absorb all the water and the particles are separated by the oil. The electrode 48 passes through this fluid upon rotation of the reel.

An electrical circuit is provided and attached to the conductor 60 and the housing 40 to subject the electro-rheological fluid 62 to a high voltage. The electrical circuit includes an inertia sensor switch 64, a program unit 66, and a high voltage control unit 68 which are connected to the conductor 60 and the ground 70 of the housing member 40. When the inertia sensor switch senses a vehicle deceleration of a predetermined magnitude, a signal is provided to the program unit which in turn energizes the high voltage control unit to subject the electrode 48 and the housing 40 to a high voltage differential.

The electro-rheological fluid 62 is exposed to this electric field and causes the water to be expelled from the particles and act as an adhesive agent making the particles congeal together. As a result, the electro-rheological fluid 62 becomes a solid and fixes the electrode 48 against rotation relative to the housing so that the reel shaft 26 and reel 24 are in turn locked against belt winding and unwinding rotation.

When the inertia condition ceases, the voltage is removed, and the electro-rheological fluid 62 returns from the solid condition to the fluid condition permitting normal winding and unwinding rotation.

It will be understood that the programming unit 66 may be constructed to vary the voltage applied to the electro-rheological fluid 62 so that the locking force applied to the electrode is varied to obtain a desired locking characteristic of the retractor.

Thus, it is seen that the invention provides a new and improved locking mechanism for a seat belt retractor.

We claim:

The embodiments of the invention in which an exclusive property or privilege is claimed are defined as follows:

1. A locking mechanism for a seat belt retractor having a belt reel rotatably mounted on a retractor housing by a reel shaft having an end, comprising:

rotationally stationary housing means of electrically conductive material mounted on the retractor housing and defining a closed cavity communicating with the end of the reel shaft;

a disk shaped electrode located in the cavity of the housing;

means attaching the electrode on the end of the reel shaft for rotation therewith and effective to electrically insulate the electrode from the reel shaft;

electrical circuit means adapted to apply a voltage differential to the electrode and the housing upon the occurrence of a sensed vehicle deceleration condition;

and an electo-rheological fluid filling the cavity, said fluid changing to a solid upon the application of the voltage thereto by the electrode and the housing so that the electrode is solidly fixed to the housing and thereby locks the electrode and the reel shaft against rotation to fix the length of the seat belt.

2. A locking mechanism for a seat belt retractor having a belt reel rotatably mounted on a retractor housing by a reel shaft having an end, comprising:

rotationaly stationary housing means of electrically conductive material mounted on the retractor housing and defining a cavity communicating with the end of the reel shaft;

a disk shaped electrode located in the cavity of the housing;

attaching means of dielectric material attaching the electrode on the end of the reel shaft for rotation therewith;

a cover of electrically conductive material mounted on the housing and closing the cavity;

electrical circuit means adapted to apply a voltage differential between the electrode and the housing and cover upon the occurrence of a sensed vehicle deceleration condition;

and an electro-rheological fluid filling the cavity, said fluid changing to a solid upon the application of the voltage thereto by the electrode and the housing so that the electrode is solidly fixed to the housing and thereby locks the electrode and the reel shaft against rotation to fix the length of the seat belt.

* * * * *